United States Patent [19]

Weinert

[11] 3,867,029

[45] Feb. 18, 1975

[54] PHOTOGRAPHIC COPYING ARRANGEMENT WITH IMPROVED COLOR COMPENSATION

[75] Inventor: Volker Weinert, Munich, Germany

[73] Assignee: Agfa-Gevaert Aktiengesellschaft, Munich, Germany

[22] Filed: Sept. 20, 1973

[21] Appl. No.: 399,184

[30] Foreign Application Priority Data

Sept. 22, 1972 Germany ........................... 2246466

[52] U.S. Cl. ....................... 355/38, 355/88, 356/177

[51] Int. Cl. ........................................... G03b 27/76

[58] Field of Search ............................... 355/35–38, 355/88; 356/175–179

[56] References Cited

UNITED STATES PATENTS 3,575,508 4/1971 Fergg et al. ....................... 355/38 X

*Primary Examiner*—Richard A. Wintercorn

*Attorney, Agent, or Firm*—Michael S. Stricker

[57] ABSTRACT

The photoelement in each of the three color channels is followed by an operational amplifier which serves as integrator during the illumination time and as proportional amplifier prior to the illumination time. The signal at the output of the operational amplifier prior to the illumination time is sampled by a sample and hold circuit which stores it in order to furnish a signal corresponding to the color density of the original in that particular color during the illumination time. This density signal forms part of a reference signal applied to a comparator during the illumination time. The comparator compares the signal at the output of the amplifier when acting as an integrator to the reference signal and terminates the exposure in the particular color when the signals at the two inputs are equal.

14 Claims, 2 Drawing Figures

PHOTOGRAPHIC COPYING ARRANGEMENT WITH IMPROVED COLOR COMPENSATION

BACKGROUND OF THE INVENTION

The present invention relates to a photographic arrangement, and more particularly to a printing arrangement having light source means which furnish light in all the required wavelengths, namely in the wavelength associated with three primary colors. Further, the present arrangements have automatic exposure control signals which comprise a first, second and third color channel. Each of these color channels have a photoelement or a plurality of photoelements which receive light in the corresponding color and furnish a corresponding electrical signal. Each of the channels then further has an integrated circuit which furnishes an output signal corresponding to the total quantity of light received by the corresponding photoelement. These output signals are herein referred to as total color signals. The exposure in each particular color is terminated when comprising means, one in each channel, indicate that the total color signal is equal to a reference signal. These conventional automatic exposure control arrangements have a drawback in that it is difficult to correct automatically for color errors. This correction is particularly difficult in that the preponderance of a particular color may actually have been desired by the photographer, rather than constituting an error. Thus, even in conventional apparatus, it has become general practice to carry out the color correction with a certain amount of undercorrection, that is, not to compensate completely for the strong preponderance of one particular color relative to the other colors.

However, the known color undercorrection circuits all operate with inputs from the above-mentioned integration circuits as they are present in each color channel at each particular time during the exposure time. However, correction circuits operating with total color signal inputs only offer approximate color undercorrection which is adequate for relatively correctly exposed orignals but is not adequate for highly overexposed or underexposed originals.

SUMMARY OF THE INVENTION:

It is the object of the present invention to furnish photographic printing apparatus and, more particularly, to furnish such photographic printing apparatus with an automatic exposure control circuit wherein exact color undercorrection of a desired degree can be carried out even for originals which are strongly over or underexposed.

The present invention resides in photographic copying apparatus for making a copy of an original. It comprises light source means for furnishing light in a first, second and third color. It further comprises first, second and third color channel means each comprising first, second and third photoreceiver means furnishing, respectively, a first, second and third total color signal corresponding to the total quantity of illumination in the respective colors which has formed on the original during the exposure time. First, second and third comparing means compare each of said total color signals to a reference singal and furnish, respectively, a first, second and third terminating signal for terminating the exposure in the particular color when the total color signal is equal to the reference signal. Further, means for furnishing a density signal are provided and means for connecting said means for furnishing a density signal to a corresponding one of said comparing means, whereby the termination of the exposure in a particular color depends also on said density signal.

In photographic equipment according to the present invention, a signal is furnished which corresponds to the deviation of the density of the original in each of the three primary color from the color density in the corresponding color of a calibrating original. The signal for the color under correction is then derived both from the above-mentioned signal and a signal signifying the average density deviation of the orignal relative to the corresponding density of the calibrating original. Further, the automatic correction circuit works on the basis of logarithmic signals, thereby allowing an exact analog of the equations for the exposure as a function of density to be derived from circuitry using summing processes.

The novel features which are considered as characteristic for the invention are set fourth in particular in the appended claims. The invention itself, however, both as to its construction and its method of operation, together with additional objects and advantages thereof, will be best understood from the following description of specific embodiments when read in connection with the accompanying drawings.

Figure 1:
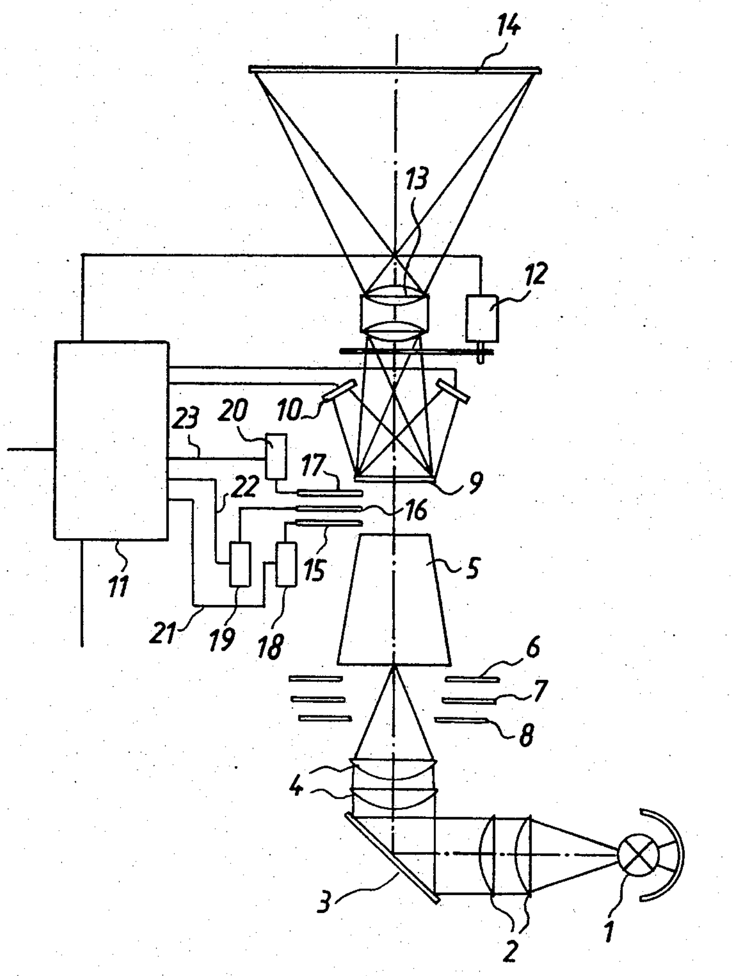
FIG. 1 is a schematic diagram of color printing apparatus in accordance with the present invention.

DESCRIPTION OF THE PREFERRED EMBODIMENTS:

A preferred embodiment of the present invention will now be described with reference to the drawing.

FIG. 1 shows a light source 1 which furnishes light in all required wavelengths. The light is thrown via a double condenser 2 onto a mirror 3 where a further condenser lense 4 focuses the light onto a mixing shaft 5. Complementary color filters 6,7 and 8 are arranged in front of the mixing shaft 5. These filters, as required, are inserted greater or smaller distances into the path of the light, thus coloring the light beam. The mixing shaft 5 causes the resulting light to be mixed homogeneously so that the light impinging upon the original 9 has an even brightness and color distribution. Following the original 9 in the direction of light propagation are a plurality of photoreceivers each of which is made sensitive selectively to the light of a particular color by the use of corresponding color filters. In a preferred embodiment of the present invention the photoreceivers are silicon photoelements 10. The silicon photoreceivers are placed outside of the path of the beam of light which is to effect the copying or print, but are arranged in the path of the stray light. Elements 10 are connected to a circuit 11 which will be described in more detail with reference to FIG. 2. Behind elements 10 in the direction of light propagation is situated an electromagnetically operated shutter 12. Situated behind shutter 12 is an objective 13 which forms a sharp image of the original 9 on the light sensitive layer of a carrier 14. The carrier 14 may for example be a roll of printing paper which is automatically advanced after each exposure time. The properties of the printing material, namely the above-mentioned photosensitive layer, are very important in the adjustment of the circuitry in stage 11.

Situated between the mixing shaft 5 and the original 9 are guides for color filters 15,16 and 17 which are filters in the complementary colors. These may be introduced into the path of the beam by means of relays 18,19 and 20. Relays 18,19 and 20 are connected via lines 21,22 and 23 to stage 11. Output signals of stage 11, namely terminating signals, are applied to each of lines 21,22 and 23 when the introduction of the corresponding complementary filter into the path of the light is desired in order to terminate the illumination in a particular color.

Figure 2:
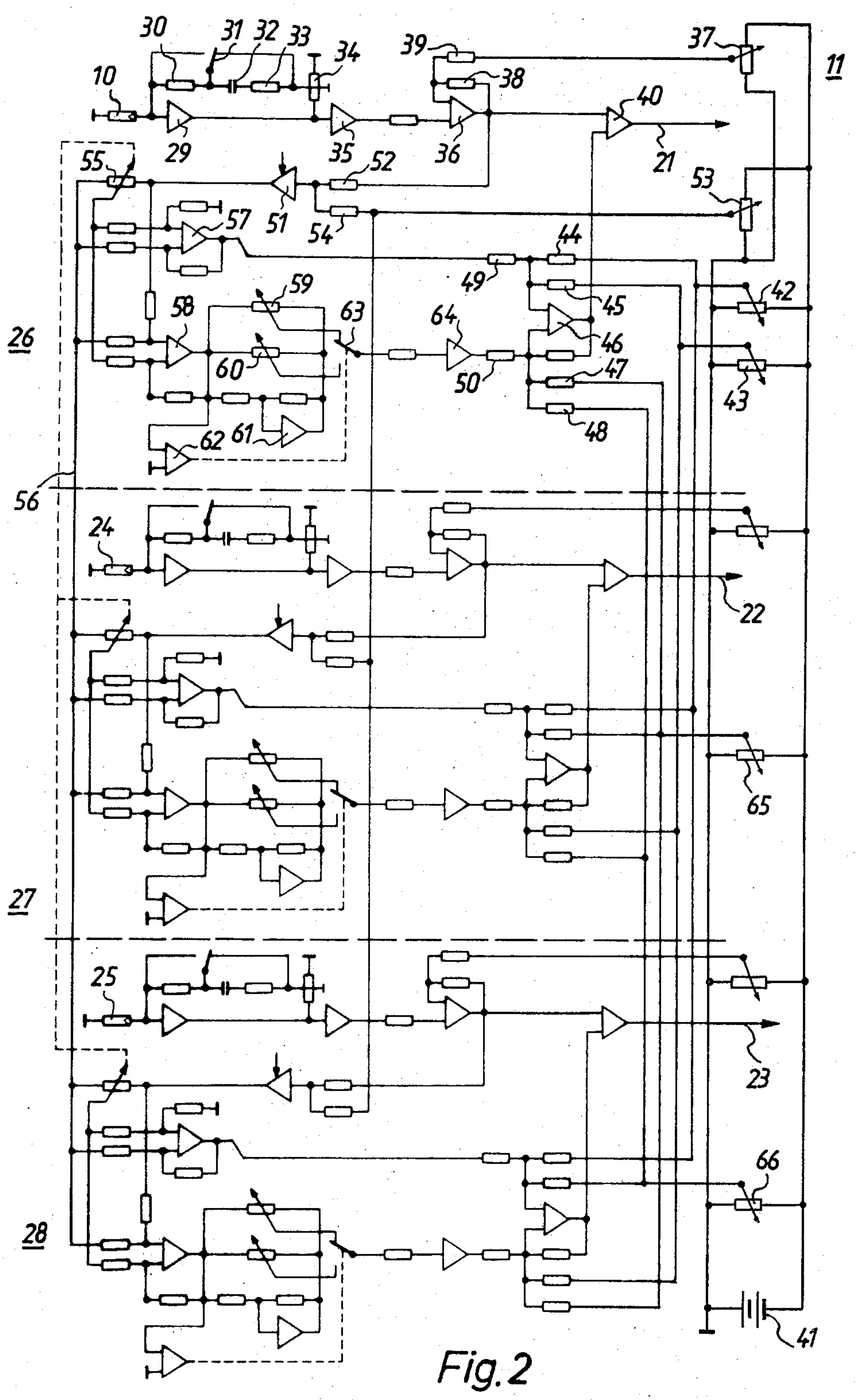
FIG. 2 is a circuit diagram for the automatic exposure control circuit of the system shown in FIG. 1.

FIG. 2 is a circuit diagram showing the circuitry in stage 11 of FIG. 1. It will be noted that this circuit comprises three color channels 26,27 and 28, each of which is used to process the signals for a corresponding color.

Since each of the color channels is exactly identical to the other, only color channel 26 will herein be described in detail. It should be noted that the silicon photoelement 10 which is represented by a single element in FIG. 2 actually represents, in a preferred embodiment of the present invention, four silicon photoelements which are connected in parallel but placed equally spaced along the region of a stray light. Directly connected to photoelement 10 is an operational amplifier 29 which has a feedback circuit having a first resistor 30, or a resistor-capacitor circuit comprising a resistor 33 and a capacitor 32 connected in series. A switch 31 is also present in the feedback circuit which, as shown in the Figure, short-circuits the resistor-capacitor circuit, thereby connecting resistor 30 into the feedback circuit of amplifier 29. In the other position (not shown) of switch 31, the resistor-capacitor circuit forms the feedback circuit for amplifier 29. A potentiometer 34 is also connected into the feedback circuit. It is the function of potentiometer 34 to allow adjustment of the feedback circuit for different formats. Connected to the output of operational amplifier 29 is a logarithmic amplifier 35 whose output is connected to the first input of a summing amplifier 36 via a resistor. Summing amplifier 36 is herein referred to as a first summing amplifier. The wiper arm of a potentiometer 37 is connected through a resistor 39 to the second input of summing amplifier 36. A resistor 38 is connected from the output of summing amplifier 36 to the second input. The end terminals of potentiometer 37 are connected to a highly constant voltage source, represented by battery 41 in FIG. 2. Specifically, one terminal of potentiometer 37 is at ground potential. The output of summing amplifier 36 is connected to the first input of a comparator 40, a preferred embodiment of comparing means. The output of comparator 40, namely a signal on line 21, is herein referred to as the terminating signal which in turn is connected to the relay which activates the first complementary filter. The complementary filters are of course herein referred to as terminating means. The above-mentioned potentiometer 37 is set to a particular value which, in a preferred embodiment of the present invention corresponds to the sensivity of the printing paper in a particular color. Alternatively, it may be set to correspond to particular characteristics of the film being used. Said setting thus remains the same as long as paper having the same emulsion number, or the same type of film is being processed. Further, in preferred embodiments of the present invention, groups of storages may be substituted for potentiometer 37 which may for example be switched from one type of film to the other, the storages containing the correct voltage values for each type of film.

Connected to the second input of comparator 40 is the output of a summing amplifier 46 at whose inputs are applied various voltages which have been set at a number of potentiometers in correspondence to various characteristics of the original. In a preferred embodiment of the present invention these voltage values are set on a potentiometer 42 and 43 whose end terminals are also connected to the end terminals of voltage source 41. The wiper arms of these potentiometers are connected, respectively, via a resistor 44 and a resistor 45 to the first input of the above-mentioned summing amplifier 46. Applied to the second input of summing amplifier 46 are voltages derived from the wiper arms of similar potentiometers in the second and third color channels. These are applied to the above-mentioned second input of summing amplifier 46 via resistors 47 and 48. A voltage corresponding to the desired color under correction in the particular channel is applied to the second input of summing amplifier 46 through a resistor 49, while a further voltage corresponding to the desired slope correction is applied to the second input of amplifier 46 via a resistor 50.

The circuit for deriving the voltage for the color undercorrection will now be described. First, it should be noted, that the output of summing amplifier 36, when switch 31 is in the position shown, constitutes a voltage indicative of the logarithm of the brightness of the original in the particular color, that is of the color density. While switch 31 is in the position shown, the signal at the output of amplifier 36, that is a color density signal, is applied to the output of sample and hold circuit 51 through a resistor 52. Also applied to the input of sample and hold circuit 51 is a signal derived from the wiper arm of potentiometer 43 through a resistor 54. Potentiometer 53 is also connected across battery 41. The signal at its wiper arm is set to represent the color density in the same color of a calibrating negative. It represents the desired slope center. Sample and hold circuit 51 thus receives a signal corresponding to the difference between the color density and the desired slope center value. It functions to retain the signal over the complete illumination period, that is it retains the signal when switch 31 is in the position not shown in the drawing and thus serves as a means for furnishing a density signal. The output of sample and hold circuit 51 is applied to the first terminal of potentiometer 55, herein referred to as a first potentiometer. The second terminal of potentiometer 55 is connected to the corresponding terminals of potentiometers in the second and third color channels. This line is designated by reference numeral 56. The signal on line 56 is thus a voltage equal to $$U_1 = 1/3 \sum_{1}^{3} (Di-DiE).$$

The wiper arms of the first, second and third potentiometers that is potentiometer 55 and the corresponding potentiometers in color channels 27 and 28, are mechanically intercoupled so that they are all moved simultaneously. If the normalized angular position of the wipers of the potentiometers are designated as $\alpha$, where $\alpha$ can vary between 0 and 1, then the voltage at the wiper arm of potentiometer 55 is equal to $$U_2=\alpha(Di-DiE)+(1-\alpha)\ 1/3\sum_{i}^{3}(Di-DiE).$$

The wiper arm of potentiometers 55 is connected to the first input of summing amplifier means 57, which are herein referred to as undercorrection summing amplifier means. The abovementioned line 56 is connected to the other input of summing amplifier 57. The voltage:

$$U_3=\alpha[(Di-DiE)-1/3\sum_{i}^{3}(Di-DiE)]$$

The output of summing amplifier 57 is connected through a resistor 49 to the input of summing amplifier 46.

The color undercorrection voltage furnished by amplifier 57 is directly proportional to the angle $\alpha$ set into the potentiometer 55. The angle $\alpha$ can of course change from 0 to 1. The first part of the portion in the brackets is proportional to the difference between the actual corresponding color density in the actual original and the color density of a calibrating original, while the second expression in the brackets described the average deviation in all three colors from the color density of the calibrating original. Thus setting of the angle $\alpha$ at the common wiper arm of all the potentiometers in the three color channels corresponding to potentiometer 55 in color channel 26 causes a color undercorrection signal multiplied by the desired factor to be applied to the first input of summing amplifier 46. For $\alpha$ equal to 0, no undercorrection takes place, that is the equation I.T=C is carried out exactly. For $\alpha$=1 a quasi color correction results which corresponds to the deviation of the color density in the particular color from the average color density of the original. Thus the illumination is carried out for a constant time, that is in accordance with the equation T=C. It should be noted that summing amplifier 46 is herein referred to as an aadditional summing amplifier means.

For furnishing the signal for slope correction, a slope summing amplifier 58 is provided. The first input of slope summing amplifier 58 is connected through a resistor to the output of sample and hold circuit 51 and through a further resistor to line 56, while its second input is connected through a resistor to the wiper arm of potentiometer 55. Connected to the output of amplifier 58 is the input of an inverter 61. Connected to the output of amplifier 58 further are in parallel potentiometers 59 and 60, the other side of which is connected to the output of inverter 61. The wiper arms of potentiometers 59 and 60 may be adjusted in such a manner that the voltage furnished at these wiper arms corresponds to each value between the positive and the negative output voltage of amplifier 58. The wiper arms may be selectively connected to the input of an amplifier 64 by means of a switch 63. The operation of switch 63 is in turn controlled by the output of a comparator 62 which operates switch 63 in accordance with the polarity of the output voltage of amplifier 58. Amplifier 64 also operates as an impedance changing stage which, in a preferred embodiment of the present invention, is an emitter-follower stage. The output of emitter-follower 64 is connected through a resistor 50 to the second input of summing amplifier 46.

The voltage at the output of amplifier 58 is given by the following equation:

$$U_4=1/3\sum_{i}^{3}(Di-DiE)+(1-\alpha)(Di-DiE)$$

The above value of voltage $U_4$ is multiplied by a factor between plut 1 and minus 1 depending on the position of the wiper arms of potentiometers 59 and 60. Comparator 62 which may be a difference amplifier, furnishes a positive or negative output voltage depending upon the sign of voltage $U_4$. For positive deviations as exist under conditions of over-exposure, one of potentiometers 59 and 60 has its wiper arm connected to amplifier 64, while for conditions of under-exposure the other potentiometer has its wiper arm so connected. In this fashion, under-exposed and over-exposed originals are illuminated with corresponding slope corrections, thus yielding considerably improved copies.

For values of $\alpha$ less than 1, a voltage at the output of amplifier 58 is affected considerably by the deviation of the original in the particular color from the corresponding density of the calibrating negative. When, however, the wiper arm of potentiometer 55 is set so that $\alpha = 1$, the voltage at the output of amplifier 58 is a function only of the average density deviation of the original relative to the density of the calibrating negative.

The output of amplifier 58 also remains constant until the end of the exposure time. During this phase of the measurement amplifier 62 can already determine whether the original is over or under-exposed and can thus control switch 63 accordingly.

Further, the settings of potentiometers 59 and 60 may be accomplished in common for all of the color channels.

As stated above, the position of switch 31 is switched substantially simultaneously with the opening of shutter 12 which initiates the printing illumination. Thus the voltage across capacitor 32 increases steadily, at a time constant determined in part by resistor 33. The time constant is such that the delay in the operation of the filters is compensated for. The increase in voltage at the input of logarithmic amplifier 35 leads to a rise in voltage at the first input of comparator 40. The signal at the second input of comparator 40 is a constant signal which is determined in part by the color undercorrection signal furnished at the output of amplifier 57. This signal of course in turn depends upon the signal corresponding to the difference between the color density of the original in the particular color and the color density of the calibrating negative, which signal is furnished at the output of sample and hold circuit 51. When the signal at the two inputs of comparator 40 are equal, a signal is furnished at line 21 which activates the relay associated with the complementary filter corresponding to the complementary color of the color associated with color channel 26, thereby terminating the illumination in that color.

If, at the beginning of the operation of the equipment, the operator has noted that a particular balance of colors exist in the original which is a desirable balance which should not be compensated for in the automatic color correction circuits, then the operator can increase the proportion of the color concerned by the adjustment of the color correction potentiometer 43 (corresponding to potentiometers 65 and 66 in color channels 27 and 28 respectively). However, the voltages derived from the wiper arms of potentiometers 42,65 and 66 also affect the comparison voltages in the other color channels, since connections between the wiper arms and the other summing amplifiers are present via resistors 47 and 48. Thus, the circuit functions to keep the total density of the reproduction constant, independent of the sensitivity in any particular color channel, by changing the sensitivity in the two other channels by a corresponding amount in the opposite direction.

The exposure of the copy is continued until signals appear on all three lines 21,22 and 23, thereby terminating the exposure of all colors. Shutter 2 is then introduced into the path of the light and switch 31 is pulled back into the position shown in FIG. 2. This causes capacitor 32 to be discharged. Other condensers such as contained in the sample and hold circuit 51 are also discharged, thereby erasing all stored values. After the new original has been positioned in the printing window, the sample and hold circuit 51 determines the density deviation of the subsequent original. The operation of the equipment then continues as described above.

Any type of photoelectric transducer such as a photoresistor or a photodiode may be used to embody element 10. The particular advantage of the silicon photoelement is that they have a high sensitivity which remains constant over a great range of impinging illumination.

Of course, instead of any of the potentiometers, step switch means with fixed resistors associated with each step may also be used.

While the invention has been illustrated and described as embodied in a specific circuitry, it is not intended to be limited to the details shown, since various structural and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In photographic apparatus for making at least one color copy of a photo original on photosensitive material, in combination, light source means for illuminating said photosensitive material through said original in a first, second and third color; a first, second and third color channel including, respectively, first, second and third photoreceiver means for receiving light corresponding to light falling on said photosensitive material in said first, second and third color and furnishing, respectively, a first, second and third total color signal corresponding to the total quantity of light received respectively in said first, second and third color; first second and third comparing means comparing said first, second and third color signals, respectively, to a reference signal and furnishing, respectively, a first, second and third terminating signal when the so compared total color signal has a predetermined relationship to said reference signal; terminating means for terminating the exposure and the corresponding color in response to each of said terminating signals; means furnishing a density signal corresponding to the density of said original in a selected one of said colors; and means for connecting said means for furnishing a density signal to the corresponding one of said comparing means, whereby the furnishing of the corresponding one of said terminating signals depends at least in part upon said density signal.

2. A photographic arrangement as set forth in claim 1, wherein said means for furnishing a density signal comprise means for furnishing a first, second and third density signal corresponding, respectively, to the density of said original in said first, second and third color; and wherein said means for connecting said means for furnishing a density signal to said comparing means comprise means for connecting said first, second and third means for furnishing a density signal to said first, second and third comparing means respectively.

3. A photographic arrangement as set forth in claim 1, wherein said means for furnishing a density signal comprise means for furnishing a density signal corresponding to the difference in density of said original in said selected one of said colors and the corresponding density of a calibrating original.

4. In photographic apparatus for making at least one color copy of a color original on photosensitive material, in combination, light source means for shining light in at least a first color through said original; photoelectric transducing means for receiving said light after passing through said original and furnishing a corresponding photocurrent; first circuit means responsive to said photocurrent and operative, prior to the start of exposure of said photosensitive material, for furnishing a density signal corresponding to the density of said original in said color; means for storing said density signal thereby furnishing a stored density signal; additional circuit means connectable to said first circuit means at the start of exposure of said photosensitive material, for modifying said first circuit means in such a manner that said first circuit means furnishes a total color signal corresponding to the total quantity of light in said color received by said photoelectric transducing means from the start of exposure of said photosensitive material; means for furnishing a reference signal varying at least in part in dependence upon said stored density signal; comparing means for comparing said total color signal to said reference signal and furnishing a terminating signal when said total color signal has a predetermined relationship to said reference signal; and means for terminating the exposure in said color upon receipt of said terminating signal.

5. A photographic arrangement as set forth in claim 4, wherein said first circuit means comprise an operational amplifier having a negative feedback resistor; and wherein said additional circuit means comprise a capacitor, whereby said operational amplifier is an integrating amplifier starting at the beginning of said exposure time.

6. A photographic apparatus for making at least one color copy of a color original on photosensitive material, in combination, light source means for shining light through said original in a first, second and third color; first, second and third color channel means having, respectively, a first, second and third photoelectric transducing element each for receiving light in a corresponding one of said colors after having passed through said original and furnishing, respectively, a first, second and third photocurrent corresponding thereto, first, second and third operational amplifier means each having an input connected to the corresponding on of said photoelectric transducing elements and each having a negative feedback circuit, each of said negative feedback circuits comprising a first resistor, a resistor-capacitor circuit, and selector switch means for switching from said first resistor to said resistor-capacitor circuit substantially simultaneously with the start of exposure of said photosensitive material, said first, second and third operational amplifier means furnishing, respectively, a first, second and third density signal corresponding, respectively, to the density of said original and said first, second and third color priot to the start of exposure of said photosensitive material and a first, second and third total color signal corresponding to the total quantity of light received, respectively, in said first, second and third color by said photosensitive material following said start of said exposure; storage means connected to said first, second and third operational amplifier means for storing said first, second and third density signals prior to said start of said exposure and furnishing a corresponding first, second and third stored density signal during said exposure; first, second and third comparing means for comparing said first, second and third total color signals, respectively, to a reference signal varying in dependence on said first, second and third stored density signals, respectively, and furnishing, respectively, first, second and third terminating signals when the so compared total color signal has a predetermined relationship to said reference signal; and terminating means for terminating the exposure in the corresponding color upon receipt of said terminating signal.

7. A photographic arrangement as set forth in claim 6, wherein each of said negative feedback circuits further comprise adjusting means for adjusting the impedence of said negative feedback circuit means for different formats of said original.

8. A photographic arrangement as set forth in claim 7, wherein each of said adjusting means comprises a trimmer potentiometer.

9. A photographic arrangement as set forth in claim 6, further comprising a first, second and third logarithmic amplifier connected, respectively, to the output of said first, second and third operational amplifier means.

10. A photographic arrangement as set forth in claim 9, further comprising first, second and third summing amplifier means each having a first input connected to the output of a corresponding one of said logarithmic amplifiers and a second input; wherein said first, second and third color channel means further comprise first, second and third means for furnishing a first, second and third sensitivity signal, respectively varying, at least in part, as a function of the sensitivity of said photosensitive material in the corresponding one of said colors; further comprising means for connecting each of said means for furnishing a sensitivity signal to the second input of the corresponding one of said summing amplifier means.

11. A photographic arrangement as set forth in claim 10, wherein said first comparing means comprise a comparator having a first input connected to the output of said first summing amplifier means, and a second input; and wherein said means for furnishing a first stored density signal comprise first sample and hold amplifier means having an input connected to the output of said first summing amplifier means when said selector switch means connects said first resistor to said first operational amplifier means, and an output for furnishing said stored density signal during the exposure time; further comprising means for connecting the output of said sample and hold amplifier means to said second input of said comparator.

12. A photographic arrangement as set forth in claim 11, further comprising means for furnishing a reference density signal indicative of the density of a calibrating original; and means for connecting said means for furnishing a reference density signal to said input of said sample and hold amplifier means.

13. A photographic arrangement as set forth in claim 12, wherein said means for connecting said output of said sample and hold amplifier means to said second input of said comparator comprise a first potentiometer having a first terminal connected to said output of said sample and hold amplifier means, a second terminal connected to the corresponding terminal of a second and third potentiometer respectively connected in said second and third color channels and a wiper arm; and undercorrection summing amplifier means having a first input connected to said wiper arm, a second input connected to said second end terminal of said potentiometer and an output for furnishing a color undercorrection signal; and additional summing amplifier means having a first input connected to said output of said undercorrection summing amplifier means and an output connected to said second input of said comparator.

14. A photographic arrangement as set forth in claim 13, wherein said additional summing amplifier means has a second input; further comprising a first and second slope signal potentiometer adjustable for different density ranges of the originals, each having a wiper arm for furnishing a slope signal having the same amplitude but opposite polarity of the slope signal furnished by the other of said potentiometers; slope summing amplifier means having a first input connected to said wiper arm of said first potentiometer of said means for connecting said output of said sample and hold amplifier means to said second input of said comparator, a second input connected to said second end terminal of said first potentiometer and an output connected to said first slope signals potentiometer; and inverter means interconnected between the output of said slope summing amplifier means and said second slope signal potentiometer; and slope signal switch means operable in dependence on the polarity of said signal at the output of said slope summing amplifier means for connecting said wiper arm of said first or said second slope signal potentiometer to said second input of said additional summing amplifier means.

* * * * *